United States Patent
Pope

[19]

[11] Patent Number: 5,896,709
[45] Date of Patent: Apr. 27, 1999

[54] MODULAR ROOF ASSEMBLY

[76] Inventor: Ralph E. Pope, 3680 Ryans Bluff, Cumming, Ga. 30130

[21] Appl. No.: 08/909,152

[22] Filed: Aug. 11, 1997

Related U.S. Application Data

[63] Continuation-in-part of application No. 08/661,979, Jun. 12, 1996, abandoned.

[51] Int. Cl.⁶ ...................................................... E04B 7/02
[52] U.S. Cl. .................................. 52/90.1; 52/82; 52/460; 52/461; 52/462; 52/463; 52/467; 52/582.1; 403/335
[58] Field of Search ...................................... 403/335, 336, 403/337; 52/460, 586.1, 582.1, 461, 462, 463, 467, 748.1, 90.1, 82

[56] References Cited

U.S. PATENT DOCUMENTS

| | | |
|---|---|---|
| 1,156,335 | 10/1915 | Waugh .................................... 52/461 X |
| 3,013,103 | 12/1961 | Pettler et al. ............................... 174/35 |
| 3,335,530 | 8/1967 | Hurd ....................................... 52/460 X |
| 3,394,508 | 7/1968 | Burke, Jr. . |
| 4,121,540 | 10/1978 | Beebe . |
| 4,784,172 | 11/1988 | Yacoboni . |
| 4,969,300 | 11/1990 | Pope . |
| 5,513,471 | 5/1996 | Worms et al. ............................... 52/82 |
| 5,522,186 | 6/1996 | Jarman . |
| 5,704,509 | 1/1998 | Rosenkrantz ......................... 403/335 X |
| 5,724,775 | 3/1998 | Zobel, Jr. et al. ........................... 52/82 |

*Primary Examiner*—Carl D. Friedman
*Assistant Examiner*—W. Glenn Edwards
*Attorney, Agent, or Firm*—William B. Noll

[57] ABSTRACT

A modular roof assembly adapted to be secured to a generally circular structure consisting of an essentially continuous upstanding wall to which the modular roof assembly may be fastened. The modular roof assembly comprises a predetermined number of roof panels to be positioned in a circular manner to form a generally conical configuration. A prime feature of the modular roof assembly is the uniquely configured, interlocking panel edges that virtually eliminate any concern for leakage through the panel joints or seams.

8 Claims, 3 Drawing Sheets

MODULAR ROOF ASSEMBLY

RELATED APPLICATIONS

This application is a continuation-in-part of U.S. Ser. No. 08/661,979, filed Jun. 12, 1996, abandoned, and entitled "MODULAR ROOF", where a preferred use therefor is for a circular, rotatable building. A related application, U.S. Ser. No. (Atty Docket No. 175), by the inventor hereof teaches an improved roller assembly for such a building, where the contents thereof are incorporated herein by reference.

FIELD OF THE INVENTION

The present invention relates to an improved modular roof of the type that incorporates a plurality of interlocking panel sections to form a generally convex, circular roof The improved modular roof hereof has particular utility for the types of circular, rotatable buildings disclosed in U.S. Pat. Nos. 4,969,300 and 4,694,620, to the present inventor, where the contents thereof are incorporated herein by reference, in their entirety.

BACKGROUND OF THE INVENTION

Buildings of the foregoing prior art patents are those having an upstanding vertical wall terminating in a roof along an upper edge thereof to enclose usuable space within the building. The walls include a lower, free standing edge spaced from a fixed foundation therewithin. Typically, the fixed foundation is defined by an outwardly facing wall spaced from the lower, free standing edge, where means are provided within the space to facilitate rotative movement between the fixed foundation and vertical wall.

While such buildings have gained success commercially, efforts to improve same have been directed primarily to the roller mechanism where binding was a concern. With that problem solved by the new roller assembly taught in (Atty Docket No. 175), attention has now shifted to the construction of the roof where leaks therein can present problems for the materials or products stored within the building. Experience has revealed other problems with modular type roof structures. For example, such roofs are often prone to rust or other premature deterioration or decay. Further, said roofs may have insufficient reinforcement to support the cumbersome weight of snow, ice or water. Additionally, as a result of the generally opaque character of the material used mi the manufacture of such roofs, interior lights must be used to view the contents of the particular structure. Finally, because the roofs are often of a single structure, damage to one part of the roof would typically require replacement of the entire roof, or even the entire building.

While the prior art patents noted above, to the inventor hereof, are directed primarily to the rotating mechanism, the commercial versions incorporating the teachings of the patents utilized a roofing structure consisting of a roof panel having an upturned edge angled at an acute angle toward the panel, and a C-configured channel overriding and slidably engaging a pair of such panel edges positioned side-by-side. One of the problems experienced occurred with ice and snow accumulation, and water leakage accompanying a thaw.

Other prior art roof structures are illustrated by the following patents:

U.S. Pat. No. 5,522,186, relates to a tree supported structure. The structure incorporates a first number member closely about the tree, and a larger lower annular member, where a number of cables extend therebetween to support a waterproof fabric for the roof, U.S. Pat. No. 4,784,172, is directed to a dome-shaped shelter formed of a plurality of three sectioned, foldable panels. The panels are characterized by a U-shaped flange along one common edge of the panels, with the opposite common edge featuring a vertically oriented flange, where with adjacent panels the U-shaped flange slidably receives the vertically oriented flange. To further secure the panels together, a series of spring clips are used;

U.S. Pat. No. 4,121,540, is directed to a conical heat-retention shell formed of a series of trapezoidal panels joined together, around the bottom edge, by aluminum straps; and U.S. Pat. No. 3,394,508, relates to a roofjoint for a pair of opposed sheet metal panels, where adjacent edges are U-shaped. To secure the respective edges together, the joint uses a tubular cap formed to present a T-shaped space therewithin.

None of the roof structures described in the above prior art, nor the commercial version employed by the inventor's rotatable buildings noted earlier, present a durable, yet waterproof modular roof as found in the present mention. The manner by which the improved modular roof of this invention achieves the desirable objectives will become more apparent in the specification which follows, particularly when read in conjunction with the accompanying drawings.

SUMMARY OF THE INVENTION

This invention is directed to an improved modular roof assembly, preferably for use on a circular building of the type associated with the storage of equipment and materials, such as a backyard shed. Specifically, the modular roof assembly includes a predetermined number of reinforced roof panels, having a predetermined size and shape, when joined together, form a convex, circular roof suitable for silos, storage facilities, basins and so forth. Each of the predetermined number of roof panels has a generally trapezoidal configuration which is specifically contoured so that a circular modular roof is provided when all of the predetermined number of panels are connected. The modular roof assembly is manufactured from a semi-transparent plastic or plastic composite. When the roof panels are all connected, a circular opening is formed in the middle of the modular roof, which opening is then covered by a cupola-type roof cap secured thereon. The modular roof further includes an outer compression ring which functions both as a means of additional support and which is intended to be secured to the leading edge of the wall of the structure where the modular roof is to be placed.

More particularly, an object of the present mention is to provide a modular roof having a plurality of equally sized and shaped roof panels which are connected to one another to form a reinforced, semi-transparent, water proof roof Another feature of this invention is that the modular roof is reinforced with longitudionally disposed roof panel ribs, preferably molded thereon, and an outer compression ring, enabling the modular roof to withstand the cumbersome weight of snow, ice or water.

Still yet another feature of the present invention is that the modular roof is easy to assemble, by simply interlocking the cooperative seams of each roof panel, or by slidably engaging the panel edges with an elongated joint element.

DETAILED DESCRIPTION OF PREFERRED EMBODIMENTS

Figure 1:
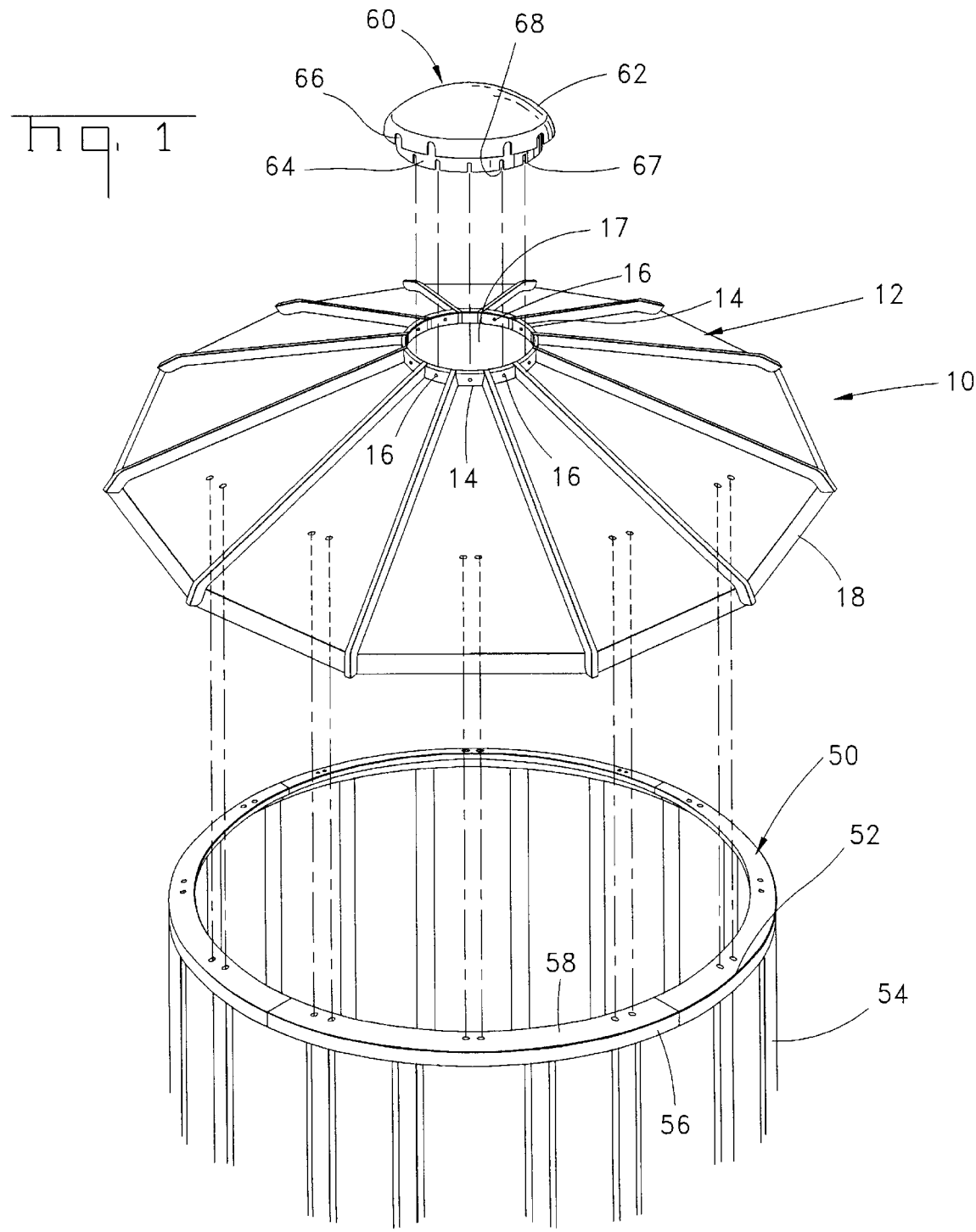
FIG. 1 is a top, exploded, perspective view of a modular roof assembly, according to the teachings of this invention, where said modular roof assembly, and accompanying conical roof cap, are shown isolated and positioned above the walls of a circular structure to which the modular roof assembly may be attached.

The present invention relates to a modular roof assembly, preferably the type that may be used with a rotatable, circular building, an exemplary embodiment of which is disclosed and claimed in U.S. Pat. Nos. 4,969,300 and 4,694,620. The construction and mounting of the modular roof assembly to the building structure are illustrated in the several drawings, where like reference numerals denote like parts throughout the different views.

Figure 2:
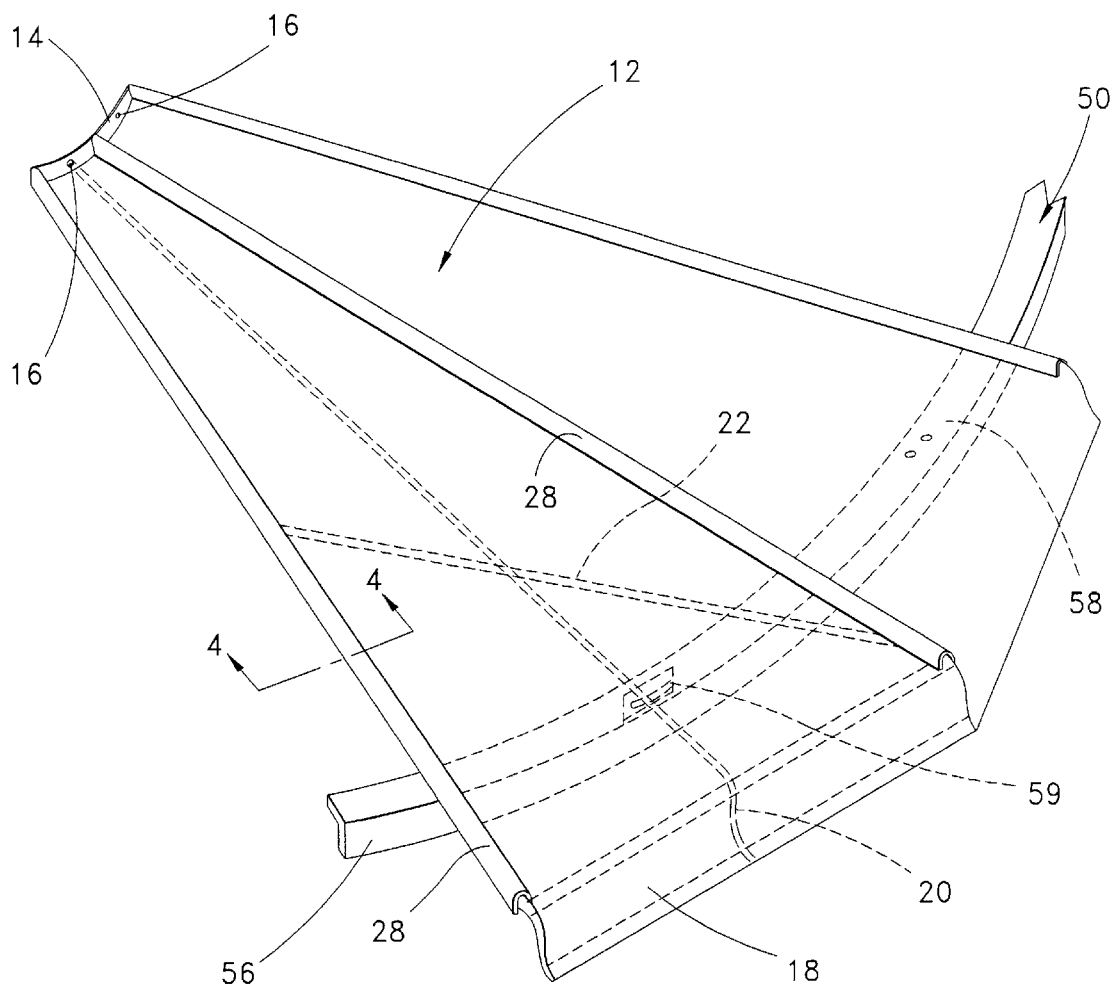
FIG. 2 is a top, partial, enlarged perspective view of two exemplary panels for the modular roof assembly of this invention, where certain hidden details are shown in phantom.

Referring first to the building and roof assembly of FIG. 1, the modular roof 10 comprises a generally circular configuration, formed of a plurality of essentially trapezoidal configured panels 12. The roof panel 12 has a vertically disposed roof panel narrow edge 14 having an arc-like configuration. The roof panel narrow edge 14 flier includes an aperture 16 bored therein, the purpose of which will be explained hereinafter. When each of the predetermined number of roof panels 12 are connected, as best seen in FIG. 1, the corresponding roof panel narrow edges 14 form a circular opening 17 in the center or apex of the modular roof 10. This circular rim, formed by the adjoining roof panels narrow edges 14 creates an inner compression ring, which also provides reinforcement for the center of the modular roof The roof panel 12 further comprises a roof panel rear edge 18 which projects downwardly from the roof panel 12, to facilitate rain and snow runoff from the roof Since the roof panels 12 are generally planar members, extending several feet from the narrow edges 14 to the rear edges 18, a central reinforcing rib 20 (FIG. 2) may be provided along the underside of the panel, preferably molded along the panel during its manufacture. Additionally, for further support and roof stability, a diagonal rib 22 or bead may be provided and extending from one converging edge of the roof panel to the other edge.

Figure 4:
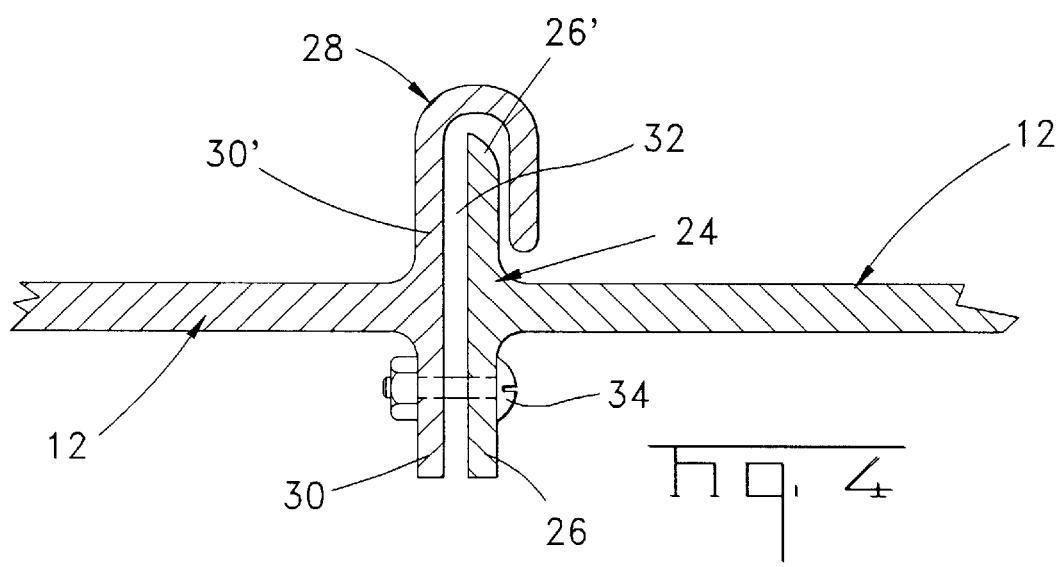
FIG. 4 is an enlarged, partially sectioned view, taken along line 4—4 of FIG. 2, illustrating a preferred intergral joint between adjacent roof panels.

The panel edges, converging from the rear edges 18 to the narrow edges 14, may be configured to effect an interlocking relationship. FIG. 4 illustrates a preferred embodiment for such configuration. It will be understood that the respective roof panels 12 are identical such that the left edges of one panel interlocks with the right edge of a second adjacent panel. FIG. 4 is an enlarged sectional view illustrating such right and left interlocking edges. The left edge 24, for example, is a T-shaped flange having a pair of opposed legs 26, 26', perpendicular to the plane of the roof panel 12. The right edge 28, of the adjacent roof panel, is similarily constructed having a pair of opposed legs 30, 30'. One obvious difference is the provision that leg 30' is bent outwardly and downwardly through 180 degrees to provide a slot 32 to snugly receive the leg 26' of the adjacent roof panel 12, hence the interlocking nature of the roof panels. To firmly secure these adjacent roof panels together, a series of fastening members 34 may be provided between the respective free legs 26, 30, where such fastening members are along the undersides of the panels away from the environment and exposure to the elements and potential leakage problems.

Figure 5:
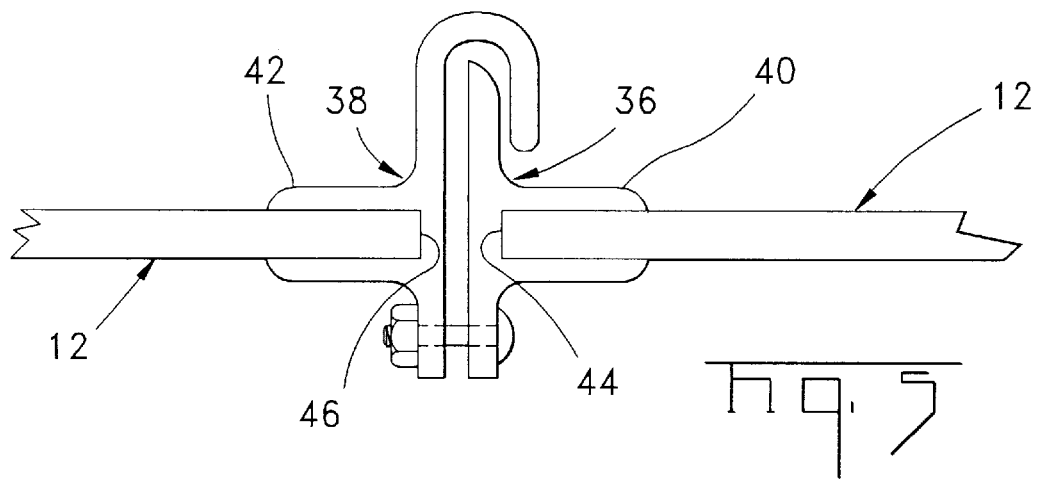
FIG. 5 is an enlarged, partially sectioned view, similar to FIG. 4, showing an alternate joint arrangement, where the joint consists of a pair of interengaging, elongated members, each secured along the side edge of a roof panel.

While FIG. 4 illustrates a preferred joint configuration, where the component features are molded integrally to the roof panels, FIG. 5 represents an alternative to such joint configuration. In the latter embodiment, where the component features are complementary to the integrally molded joint of FIG. 4, each edge configuration may comprise an elongated, preferably extruded component, such as from plastic, where the respective edge members 36, 38 feature a slotted leg 40, 42 into which the roof panel edge 44, 46 may be slidably received. To the extent that supplemental means are desired to secure the roof panel within a respective slotted leg 40, 42, a fastening member, not shown, may be used. If leakage from the environment is a concern, a rubberized sealing grommet, as known in the art, may be used.

Figure 3:
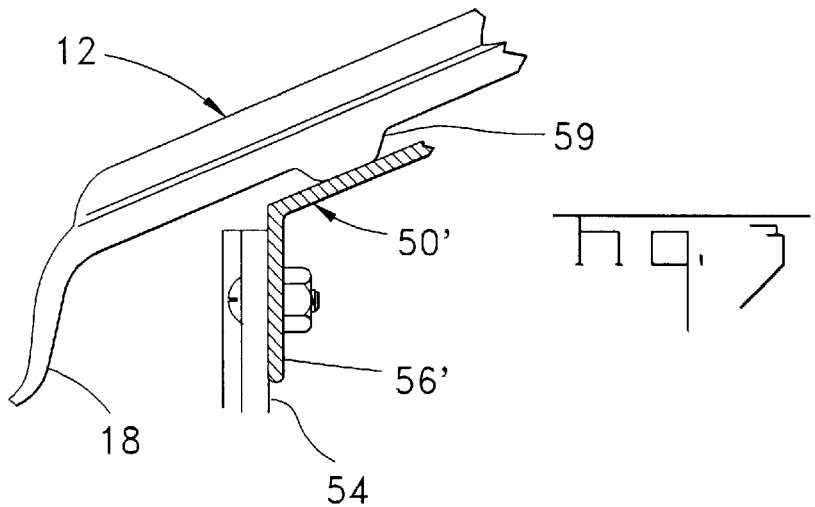
FIG. 3 is an enlarged, partially sectioned view illustrating an alternate embodiment for securing the modular roof assembly to the underlying building structure.

Returning now to FIGS. 1 and 2, the building structure, underlying the modular roof assembly, includes a panel mounting compression ring 50. The compression ring 50 is generally a continuous L-shaped flange 52, preferably formed in segments, secured to the upstanding wall 54 along a first leg 56 thereof and includes an inwardly and upwardly directed angled leg 58 to which the respective roof panels 12 are attached. The obtuse angle of the leg 58 is such as to be generally positioned to lie parallel to the angle of the overlying modular roof 10. As seen in FIG. 3, showing an alternate position for the compression ring 50', the underside of the roof panel may include an in-molded bump 59, i.e. a thicker section, to which the respective compression rings 50, 50' may be fastened to the appropriate roof panels by the use of fasteners, as known in the art. Briefly, for the alternate compression ring 50' of FIG. 3, a first leg 56' is shown as being secured along the inside of upstanding wall 54.

To provide an aesthetic, yet functional quality to the assembled building and modular roof, a cupola-like roof cap 60 (FIG. 1) may be provided for the roof opening 17. The roof cap 60, intended to provide ventilation to the building, comprises a hemispherical top portion 62 terminating in a pair of concentric, annular rims 64, 66, where the inner rim 64 is sized to fit contiguous watch the inner compression nag, i.e. assembled narrow rims 14, and to be secured thereto by fasteners through the respective apertures 16 and complementary slots 67. The outer rib 66 is provided with plural slots 68 disposed uniformly thereabout, where said slots 68, radially displaced from slots 67, are sized and positioned to override a respective panel joint or seam, as best seen in FIG. 1.

I claim:

1. A modular roof assembly adapted to be secured to a generally circular structure consisting of an essentially continuous upstanding wall terminating in a first annular compression ring to which said modular roof assembly may be secured, where said modular roof assembly comprises a predetermined number of roof panels to be positioned in a circular manner to form a generally conical configuration, each said roof panel comprising a generally trapezoidal-like configured planar member defined by a first narrow edge opposite from a second wider edge, and a pair of side edges each converging from said second edge to said first edge, where a first said side edge includes a T-shaped flange, with the two opposing legs thereof being perpendicular to the plane of said panel, and said second side edge includes a second T-shaped flange having one of the two opposing legs bent through an angle of 180 degrees away from the planar surface of its roof panel, whereby when a pair of said roof panels are assembled side-by-side the bent and angled leg of said second T-shaped flange overdoes one of the opposed legs of said first T-shaped flange of the adjacent roof panel, and that the free said opposed legs of the respective T-shaped flanges of adjacent roof panels face one another for securing together.

2. The modular roof assembly according to claim 1, wherein said first narrow edge includes an upstanding, arcuate-shaped rim, and that when a plurality of said panels are assembled into a generally circular structure, said rims define a circular opening while creating a second annular compression ring for reinforcing said roof assembly.

3. The modular roof assembly according to claim 2, wherein said first annular compression ring cooperates with said assembled rims in supporting said roof assembly.

4. The modular roof assembly according to claim 1, wherein said respective T-shaped flanges are integrally joined to said first and second side edges.

5. The modular roof assembly according to claim 1, wherein said respective T-shaped flanges are separate elongated members, where the non-aligned legs thereof each include a longitudinal slot for receiving a respective side edge of said panel.

6. The modular roof assembly according to claim 1, including at least one supporting rib integrally formed with and on the underside of said panel, whereby to provide structural support and stability to said panel.

7. The modular roof assembly according to claim 2, including a cupola-like roof cap disposed over said circular opening and secured to said rims.

8. The modular roof assembly according to claim 7, wherein said cupola-like roof cap comprises a hemispherical portion terminating in a pair of downwardly extending, concentric, annular rims, where a first said annular rim is secured to said first narrow edges, and a second said annular rim, containing plural slots, is adapted to override said bent and angled legs of the assembled panels.

* * * * *